United States Patent [19]
Kollen

[11] Patent Number: 5,317,832
[45] Date of Patent: Jun. 7, 1994

[54] FLOWER HOLDER

[76] Inventor: Myron H. Kollen, 12177 Indian Lake Dr. W., Vicksburg, Mich. 49097

[21] Appl. No.: 52,370

[22] Filed: Apr. 23, 1993

[51] Int. Cl.$^5$ ............................................. A01G 5/00
[52] U.S. Cl. ....................................................... 47/41.12
[58] Field of Search .................................. 47/41.12, 79

[56] References Cited

U.S. PATENT DOCUMENTS

| | | | |
|---|---|---|---|
| 3,003,284 | 10/1961 | Smithers | 47/41.12 |
| 3,374,575 | 3/1968 | Tong | 47/41.12 |
| 3,826,041 | 7/1974 | King | 47/41.12 |
| 3,867,789 | 2/1975 | Jacobson | 47/41.12 |
| 3,949,568 | 4/1976 | Gallagher | 47/41.12 |
| 3,962,825 | 6/1976 | O'Connell | 47/41.12 |
| 4,858,381 | 8/1989 | Walton et al. | 47/41.12 |

FOREIGN PATENT DOCUMENTS 1544630  4/1979  United Kingdom .

OTHER PUBLICATIONS

Official Gazette Abstract of U.S. Pat. No. 3,962,825 of Jun. 15, 1976 (O'Connell).
Copy of Cleveland Plant & Flower Company; brochure entitled "Foam Mate ®", numbered FM2-92 including #610 Foam Mate Tray; 2 pgs.
Copy of Flambeau Products Corporation; brochure entitled "Vlchek ® Brand Quality Floral Products", numbered 253-0108 (Jan. 1991) 5M, 8 pgs.
Copy of The John Henry Company; brochure entitled "Never-Wilt Containers", numbered ADV414 Apr. 1991; 8 pgs.
Western Pulp Products Company; brochure entitled "The Gripper", numbered 5M192 1227, 2 pgs.
Photos 2, 3 and 4 showing a different view of the same 4 devices, namely: a) Artful Casket Saddle CC637 b) Never-Wilt Saddle ® SM2000 (brochure copy above) c) Vlchek PS10 (brochure copy above) d) Foam Mate 611 (brochure copy above) Photo 5 shows above listed items a. and b.

*Primary Examiner*—Ramon S. Britts
*Assistant Examiner*—Joanne C. Downs
*Attorney, Agent, or Firm*—Flynn, Thiel, Boutell & Tanis

[57] ABSTRACT

A holder for a water saturable block of the kind used for holding the stems of cut flowers, greenery and the like in floral displays. A preferred holder is box-like and watertight, except for a hole in the central portion of its top wall for receiving water and into which a water saturable block is insertable. Lips at the edge of the hole slope toward the bottom wall of the holder and laterally inward toward the center of the hole for fixedly holding a block in the hole, retarding water leakage out of the holder past the block, helping guide insertion of a block into the hole, reinforcing the edge of the hole and helping retain water in the holder upon tilting of the holder with or without a block in the hole. Depending legs at the corners of the holder help support it on, for example, flat table tops or convex casket tops.

14 Claims, 2 Drawing Sheets

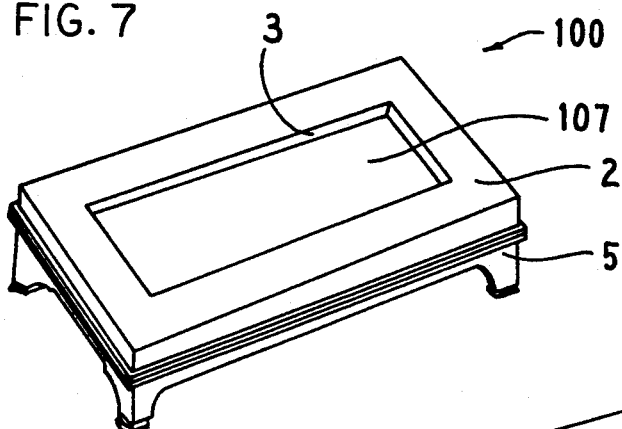
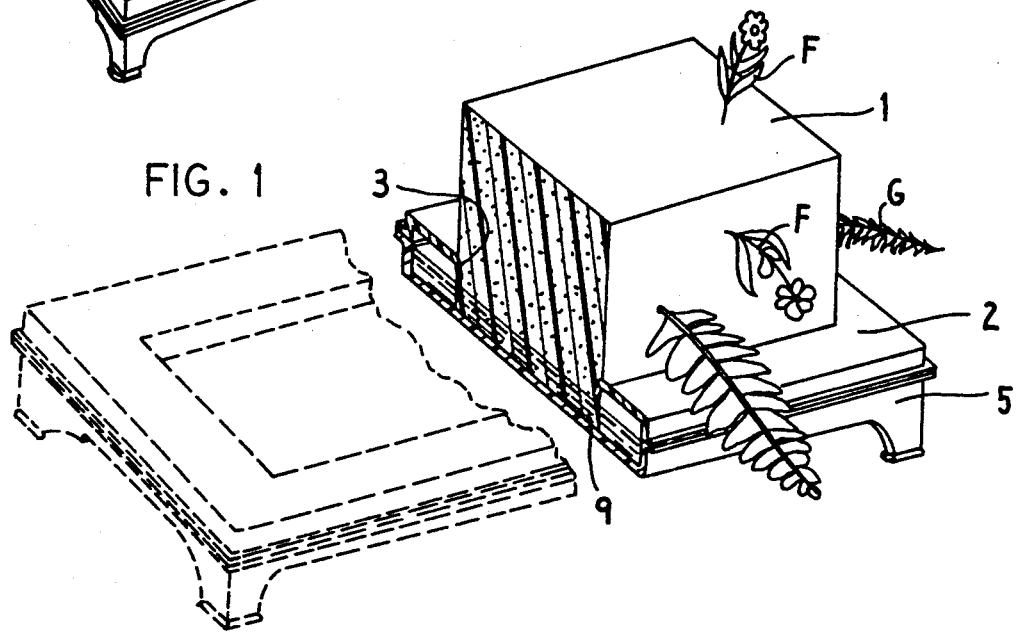
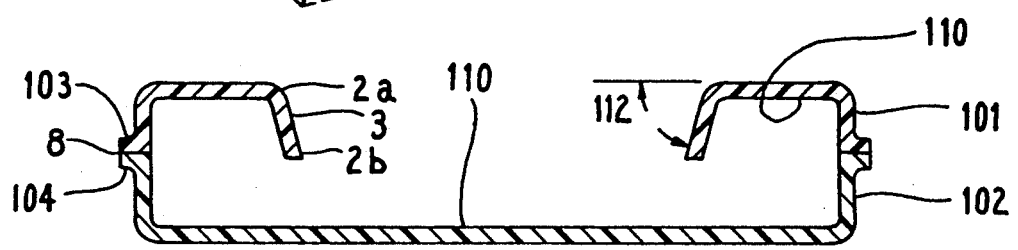

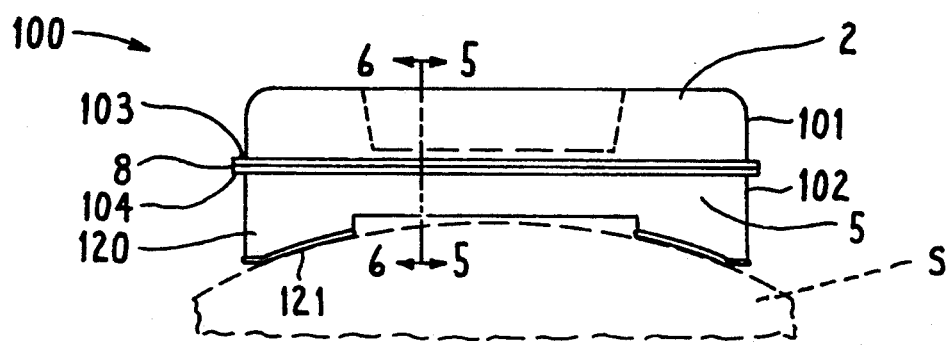
FIG. 2
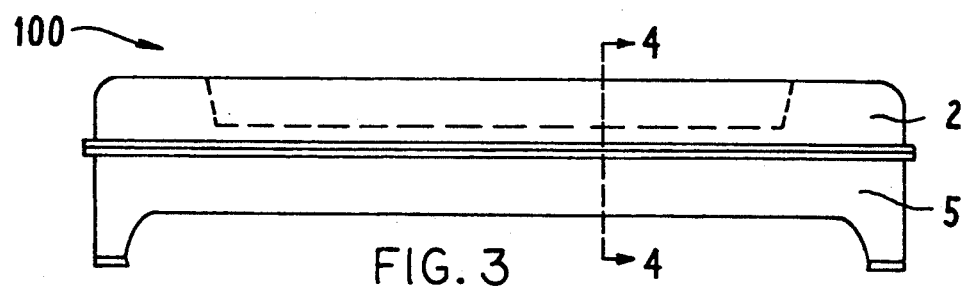
FIG. 3
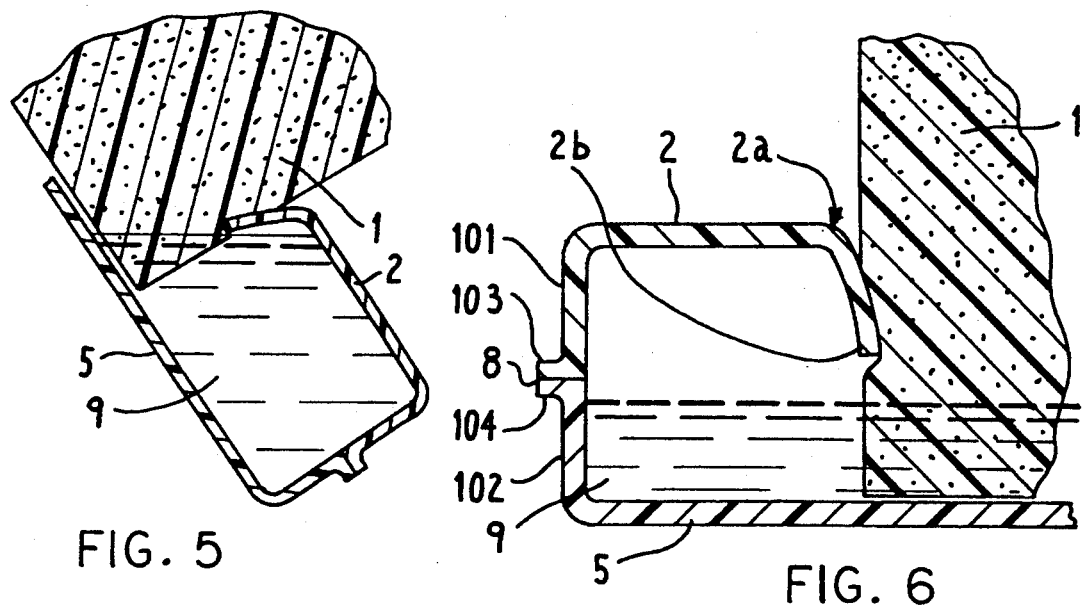
FIG. 5
FIG. 6

FLOWER HOLDER

FIELD OF THE INVENTION

This invention relates to a flower holder.

BACKGROUND OF THE INVENTION

Floral trays, dishes, or holders are typically, but not exclusively, used for retaining water absorbent saturable blocks which are then impregnated with the stems of cut flowers or similarly attractive live or synthetic products for use on coffins, party tables, shelves, or furniture.

Several prior types of products have been, or are being, used to secure the saturable block to a paper mache or plastic tray, holder or container.

One group of these prior products secures the absorbent saturable block by means of tape, straps, wires, glue or similar securing assists. The use of wires, straps, etc. involves labor time, questionable securing quality, an inventory of materials—all of which are costly and therefore undesirable.

Another group of prior products merely supports the water saturable block between the upstanding sidewalls of a simple upward opening rectalinear tray. Positioning of the block between the sidewalls of papier mache or plastic trays is an effort to minimize cost. However the physical securing of the block to the tray or holder is at best limited.

Some prior products make an effort to store excess water in a double bottom of the tray or holder. However, water stored in the double bottom does not wet the block, or, if allowed to escape, is easily spilled.

My invention is intended to avoid these and other disadvantages of such prior devices.

SUMMARY OF THE INVENTION

A holder for a water saturable block of the kind useable for supporting the stems of cut flowers, greenery and the like. The holder has a bottom wall, sidewalls and a top wall defining a water tight chamber but with a hole in the top wall wherein the top wall defines a strip between the hole and the sidewalls. Structure on the top wall strip bounds the hole to facilitate placement of a block in the hole and to retard water leakage from inside the holder through the hole.

BRIEF DESCRIPTION OF THE DRAWINGS

FIG. 1 is a perspective view partially broken away to show the assembled relationship of the water saturable block and the inventive holder.

FIG. 2 is an end view of the FIG. 1 holder showing the contour of the lower portion to mount on the curved face of a casket as well as a flat surface.

FIG. 3 is a side view of the FIG. 1 holder.

FIG. 4 is an enlarged sectional view substantially taken in line 4—4 of FIG. 3.

FIG. 5 is an enlarged fragmentary sectional view substantially taken on the line 5—5 of FIG. 2 and showing relocation of water in FIG. 6 due to tilting of the holder.

FIG. 6 is an enlarged fragmentary sectional view substantially taken on the line 6—6 at FIG. 2.

FIG. 7 is a perspective view of an assembled holder.

DETAILED DESCRIPTION

Referring to FIG. 1, a water saturable block i has the property of wicking and saturating itself if immersed in water. It is easily impregnable with the stems of cut flowers F and greens G, and acts as a nourishment for the flowers and greens placed therein. The blocks 1 are available in standard sizes and shapes, but may be formed to any other shape and size by simple saw, wire, Marvin Avenue, P.O. Box 118, Kent, Ohio 44240, and for further discussion will be assumed to be of a size about $3\frac{1}{8}'' \times 4\frac{1}{4}'' \times 9\frac{1}{4}''$ within manufacturing tolerances.

A holder 100 embodying the invention comprises a deck 2 fixed atop a dished tray 5. The deck 2 and tray 5 have sidewalls 101 and 102 terminating respectively in opposed radially outward extending flanges 103 and 104 in turn having opposed sealing surfaces 8. The holder 100 can be made by various commercially common manufacturing methods such as injection, blow, and thermal molding, of a suitable plastic material.

In this invention, polystyrene is the preferred plastic since it has greater latitude for sealing the deck 2 to the tray 5 via sealing surfaces 8.

Acceptable sealing may be accomplished by vibration welding, heat sealing, solvent or cement sealing, or other conventional means. FIG. 1 illustrates the joining of the deck 2 to the tray 5 near the middle of the height of the holder 100. This position may be varied either up or down as desired for ease of manufacture. This fixing of the flanges increases structural rigidity.

FIGS. 1 and 7 show a central hole 107 in the deck 2 which hole is bordered by sloped lips 3. For ease of positioning the saturated block 1 in the hole 107, of deck 2, the space between the top portion 2a of the lips 3 must be larger than the block 1. My experimentation has determined that $\frac{1}{8}''$ to $\frac{3}{8}''$ larger is satisfactory.

To assure that the block 1 is firmly held by the lips 3 after insertion, the width between the bottom edges 2b of the lips 3 must be smaller than the width of the block 1 by about $\frac{1}{8}''$ to $\frac{3}{8}''$.

The distance between the bottom 2b of the lips 3 and the floor 110 of the tray 5 preferably is at least $\frac{1}{4}''$ to assure that the fragile structure of the block 1 does not break away. In one unit constructed in accord with the invention, the height from the floor 110 of trays 5 to the top wall 111 of the deck 2 was about 1.5" to 2.0", and the slope 112 was about 60 degrees.

When the saturated block 1 is inserted into the holder 100 after adding water to the holder 100, the water in the holder 100 will be displaced by the block 1 to the other areas of the holder 100, causing the level in the holder 100 to rise. This assures continued good contact of the saturated block 1 with the water in the holder 100, resulting in excellent continued saturation by wicking, thereby prolonging floral arrangement life. If a holder 100 is to be used for a fresh cut arrangement, a prescribed amount of water is added to the holder 100. The deck 2 seals to the tray 5 to resist spillage despite handling and tilting. This property is further augmented after the saturated block 1 has been inserted into the hole 107 in the deck 2.

A substantial amount of water can be held without spillage during normal handling and tilting. The quantity is estimated by establishing the severity of the handling and tilting anticipated. For example, with the above mentioned 1.5" to 2.0" height of a holder 100 and a 1.5" to 2.0" wide deck 2 top surrounding a $4\frac{1}{4} \times 9\frac{1}{4}''$ block 1, a pint of water in the holder 100 will not be spilled by a 60 degree tilt of the holder 100, as indicated in FIG. 5. If a less severe tilt is acceptable, a greater quantity of water 9 may be stored, even to the full capacity of the holder 100, for example, 0.5 gallon.

As seen in FIG. 6, the lip 3 will resiliently deflect slightly upon snug insertion of the bottom portion of block 1, therepast, thereby tending to frictionally (and with a soft block 1, mechanically) grip and entrap the block 1 and, at the same time, create a water seal between the block 1 and the lower edge 2b of the lip 3.

This invention is the result of many observations in a retail florist shop and it addresses the near instantaneous securing of the saturable or saturated block 1 to the deck 2 via insertion into a hole 107 in the deck 2 bonded to the tray 5. Because the deck 2 and the block 1 act as a cover for the holder 100, spillage of water is minimalized during severe handling conditions.

Added water 9 in the holder 100 continuously contacts with the saturated block 1 so the water lost from the block 1 by evaporation or fresh flower draw is replaced in the block 1.

The hole 107 in the deck 2 is so designed that physical fixing of the block 1 to the holder 100 occurs when the user hand presses the block 1 into the hole 107 of the deck 2, making accidental withdrawal almost impossible.

Introduction of the block 1 into the hole 107 of the deck 2 effectively closes the holder 100 so spillage during normal handling is minimized.

In the embodiment shown, portions of the holder 100 sidewalls extend down to form legs 120 having resilient feet 121 (FIG. 2) for nonskid support of the holder 100 on a flat or shaped (e.g. upwardly convex) surface such as a table or casket top.

The embodiments of the invention in which an exclusive property or privilege is claimed are defined as follows:

1. A holder for cut flowers, greenery, and the like and locatable on tops of caskets, tables and the like, comprising:
   a bottom wall;
   sidewalls upstanding from said bottom wall around the perimeter thereof;
   a top wall having a perimeter fixed to the top of said sidewalls, said bottom wall and sidewalls and top wall being of watertight, substantially rigid material and surrounding an interior chamber capable of holding a quantity of water in a leakproof manner;
   means defining a hole in the top wall for insertion of the bottom portion of a water saturable block of a suitable material for receiving and supporting stems of cut flowers, greenery and the like, and thereby for engagement of the bottom of such a block with water on said bottom wall and within said chamber, said top wall defining a strip surrounding said hole and of width extending from said hole outward to said sidewalls;
   means on said top wall strip and bounding said hole for:
   (1) fixedly holding a water saturable block in said hole,
   (2) retarding water leakage out of said chamber between said top wall and a block in said hole,
   (3) helping guide insertion of a block into said hole,
   (4) reinforcing the edge of said hole, and
   (5) helping retain water in said chamber upon tilting of the holder with no block in said hole.

2. The apparatus of claim 1 in which said means bounding said hole comprises a lip sloping into said hole and toward said bottom wall from said top wall strip and forming a funnel-like mouth at said hole.

3. The apparatus of claim 2 in which said lip has bottom edge means spaced between said bottom and top walls for engaging a block inserted in said hole and retarding withdrawal of a block from said hole.

4. The apparatus of claim 2 in which said lip is continuous around the perimeter of said hole.

5. The apparatus of claim 1 in which said sidewalls and bottom wall and top wall strip define sump means for retaining water in the holder despite substantial tipping of the holder.

6. The apparatus of claim 5 in which said means bounding said hole comprises a lip sloping into said hole and towards said bottom wall from said top wall strip, said lip increasing the effective depth of said sump.

7. The apparatus of claim 1 in which said walls are of substantially rigid plastic sheet material.

8. The apparatus of claim 7 in which said material is polystyrene.

9. The apparatus of claim 1 in which said bottom wall and lower portion of said sidewalls form an upward opening cup like tray, said top wall and upper portions of said sidewalls forming an inverted cup like deck opposing said tray, said tray and deck sidewall portions having peripherally continuous opposed laterally outward extending flanges and means sealing said tray and deck flanges together fixedly and watertight to make the holder an essentially one-piece item.

10. The apparatus of claim 1 in which portions of said sidewalls extend down past the central portion of said bottom wall on opposite sides of said holder for making said holder bottom effectively concave downward, to enable the holder to straddle a portion of a convexly rounded casket top as well as sit on a flat table.

11. The apparatus of claim 10 in which said downward extending portions of said sidewalls form legs on opposite sides of the holder.

12. The apparatus of claim 11 including resilient feet on the bottoms of said legs for reducing likelihood of skidding of the holder on a supporting surface.

13. The apparatus of claim 12 in which said feet have substantially coplanar, laterally outer portions and upwardly convergent, laterally inner portions, said outer portions being adapted to sit flat on a flat table, said inner portions being adapted to approximately conform to the shape of an upwardly convex casket top.

14. The apparatus of claim 11 in which said top and bottom walls are substantially rectangular and said legs depend from the resulting four corners of the holder.

* * * * *